United States Patent
Brookins et al.

(10) Patent No.: US 12,247,107 B2
(45) Date of Patent: Mar. 11, 2025

(54) FLAME RETARDANT POLYMERS AND METHODS OF MAKING

(71) Applicant: Alexium, Inc., Greer, SC (US)

(72) Inventors: Robert N Brookins, Simpsonville, SC (US); Benjamin R. Butterfield, Boston, MA (US); Nicholas H. Leitner, Greer, SC (US)

(73) Assignee: ALEXIUM, INC., Greer, SC (US)

( * ) Notice: Subject to any disclaimer, the term of this patent is extended or adjusted under 35 U.S.C. 154(b) by 482 days.

(21) Appl. No.: 17/046,978

(22) PCT Filed: Apr. 12, 2019

(86) PCT No.: PCT/US2019/027349
§ 371 (c)(1),
(2) Date: Oct. 12, 2020

(87) PCT Pub. No.: WO2019/200333
PCT Pub. Date: Oct. 17, 2019

(65) Prior Publication Data
US 2021/0147636 A1    May 20, 2021

Related U.S. Application Data

(60) Provisional application No. 62/656,944, filed on Apr. 12, 2018.

(51) Int. Cl.
*C08G 79/04* (2006.01)
*C09D 185/02* (2006.01)

(52) U.S. Cl.
CPC .......... *C08G 79/04* (2013.01); *C09D 185/02* (2013.01)

(58) Field of Classification Search
CPC .................................................. C08G 79/04
See application file for complete search history.

(56) References Cited

U.S. PATENT DOCUMENTS

| | | | | |
|---|---|---|---|---|
| 2,809,941 A | * | 10/1957 | Guthrie | C08G 79/06 528/367 |
| 2,812,311 A | * | 11/1957 | Reeves | C08G 79/06 525/515 |
| 2,983,623 A | | 5/1961 | Coates | |
| 3,351,617 A | | 11/1967 | Jaeger | |
| 4,376,211 A | | 3/1983 | Frank | |
| 9,453,112 B2 | | 9/2016 | Gerhardt et al. | |
| 2015/0051328 A1 | | 2/2015 | Ye et al. | |
| 2015/0118931 A1 | | 4/2015 | Gerhardt et al. | |
| 2017/0002150 A1 | | 1/2017 | Gerhardt et al. | |

FOREIGN PATENT DOCUMENTS

| | | | |
|---|---|---|---|
| CN | 1498240 A | 5/2004 | |
| CN | 105263639 A | 1/2016 | |
| GB | 740269 A | * 11/1955 | |
| GB | 1522108 A | * 8/1978 | ............ C07F 9/5449 |
| JP | 50-40198 B2 | * 12/1975 | |
| WO | WO 01/81635 A1 | 11/2001 | |
| WO | 2004026884 A | 4/2004 | |
| WO | 2012156190 A1 | 11/2012 | |
| WO | WO 2015/189739 A1 | 12/2015 | |

OTHER PUBLICATIONS

Basch et al. The Chemistry of THPC-Urea Polymers and Relationship to Flame Retardance on Wool and Wool-Polyester Blends. I. Chemistry of THPC-Urea Polymers. J. Poly. Sci: Poly. Chem., 1979, 17, 27-37. (Year: 1979).*
Machine Translation of JPS50-40198B2. Dec. 22, 1975. (Year: 1975).*
Kindley et al. Novel Phosphorus Containing Polymers. SPE Transactions, 1962, 122-125. (Year: 1962).*
International Search Report and Written Opinion; Jun. 11, 2019 in related PCT application No. PCT/US2019/027349; 13 pgs.
CN201980039343.X, "Notice of Decision to Grant", Jan. 20, 2023, 4 pages.
CN201980039343.X, "Office Action", May 10, 2022, 11 pages.
EP19786131.3, "Extended European Search Report", Dec. 14, 2021, 5 pages.
IN202017048654, "First Examination Report", Apr. 22, 2022, 6 pages.
PCT/US2019/027349, "International Preliminary Report on Patentability", Oct. 22, 2020, 10 pages.
PCT/US2019/027349, "International Search Report and Written Opinion", Jun. 11, 2019, 13 pages.

(Continued)

*Primary Examiner* — Stephen E Rieth
(74) *Attorney, Agent, or Firm* — Kilpatrick Townsend & Stockton LLP

(57) ABSTRACT

Polymers useful for imparting flame resistance to fibers and textiles are provided herein. The polymers are water-soluble, phosphine oxide-containing polymers that may be reaction products of hydroxymethyl phosphonium salts or hydroxymethyl phosphines with linking monomers, wherein at least 20% of the phosphorous atoms of the polymer are present as phosphine oxides. Formulations including the polymers and methods of using the polymers to impart flame resistance to fibers and textiles are also disclosed.

29 Claims, 1 Drawing Sheet

(56) References Cited

OTHER PUBLICATIONS

Daigle, et al., "Chemistry of Hydroxymethyl Phosphorus Compounds Part IV. Ammonia, Amines, and THPOH: A Chemical Approach to Flame Retardancy", Textile Research Journal, vol. 52, No. 12, Available online at: https://doi.org/10.1177/004051758205201203, Dec. 1982, pp. 751-755.

Frank, et al., "Chemistry of Hydroxymethyl Phosphorus Compounds Part II. Phosphonium Salts", Textile Research Journal, vol. 52, No. 11, Available online at: https://doi.org/10.1177/004051758205201102, Nov. 1982, pp. 678-693.

Frank, et al., "Chemistry of Hydroxymethyl Phosphorus Compounds Part III. Phosphines, Phosphine Oxides, and Phosphonium Hydroxides", Textile Reseach Journal, vol. 52, No. 12, Available online at: https://doi.org/10.1177/004051758205201202, Dec. 1982, pp. 738-750.

Vail, et al., "Chemistry of Hydroxymethyl Phosphorus Compounds Part 1: Introduction", Textile Reseach Journal, vol. 52, No. 11, Available online at: https://doi.org/10.1177/004051758205201101, Nov. 1982, pp. 671-677.

AR Horrocks et al., "Handbook of Technical Textiles," pp. 247-249, 2000, 5 pages.

C.M. Carr, "Chemistry of the Textiles Industry," pp. 117-120, 1995, 6 pages.

Edward D. Weil et al., "Flame Retardents for Plastics and Textiles," pp. 203-206, 2009, 6 pages.

Donald M. Soignet et al., "Electron Spectroscopy for Chemical Analyses (ESCA) of THPOH-$NH_3$-Treated Fabrics," Textile Research Journal, Southern Regional Research Center, New Orleans Lousinana, Jan. 1975, 2 pages.

D.M. Soignet, "Determination of Trivalent Phosphorous in Flame-Retardent Textiles," Textile Research Journal, Southern Regional Research Center, New Orleans Lousinana, Aug. 1979, 3 pages.

"Zetasizer Nano User Manual," MANO485 Issue 1.1, Apr. 2013, 14 pages.

"Dynamic Light Scattering: An Introduction in 30 Minutes," Malvern Analytical, Nov. 4, 2010, retrieved Jun. 21, 2024, 19 pages.

Hans Diem et al., "Ullmann's Encyclopedia of Industrial Chemistry: Amino Resins," vol. 3, Wiley-VCH Verlag GmbH & Co. KGaA, Weinham, 2012, 28 pages.

Ming Liu et al. "Characterization of the crystalline regions of cured urea formaldehyde resin," RSC Advances, Royal Society of Chemistry, vol. 7, pp. 49536-49541, Oct. 25, 2017, 6 pages.

* cited by examiner

FLAME RETARDANT POLYMERS AND METHODS OF MAKING

CROSS-REFERENCE TO RELATED APPLICATIONS

This application is a national stage entry of PCT Application No. PCT/US2019/027349, filed Apr. 12, 2019, which claims priority to U.S. Provisional Patent Application No. 62/656,944, filed Apr. 12, 2018, each of which is hereby incorporated herein by reference in its entirety.

FIELD

Described herein are water-soluble phosphine oxide-containing polymers useful as flame retardant products for the flame retardation of substrates, including fibers and textiles, such as those including cellulosic or proteinaceous materials.

BACKGROUND

One means of imparting flame resistance to cellulosic-rich fibers and textiles is employing chemical applications based on tetrakis(hydroxymethyl)phosphonium (THP) compounds. THP-based chemistries can provide a durable coating which results in effective flame resistance. As such, flame retardants based on THP chemistries have been the standard for imparting flame resistance to cotton-rich fabrics.

While they provide effective flame retardation, current manufacturing processes for applying THP-based chemistries to fibers and textiles are intensive, costly, inconsistent, and hazardous due to their high formaldehyde content. The standard methods for using THP-based chemistries to treat cellulosic-rich fibers, textiles, or fabrics rely on ammoniation chambers to cure an oligomeric condensate of THP and another monomer such as urea onto the fiber, textile, or fabric. This curing process crosslinks the THP-urea oligomers onto and/or around the fibers, textile, or fabric, converting the oligomeric condensate into a network polymer. The network polymer is insoluble due to the network of covalent bonds throughout the polymer giving a near-infinite molecular weight. After conversion to the insoluble network polymer, to finish the treating process, the fibers, textile, or fabric must be immersed in an oxidizing solution followed by multiple wash baths. This process is known in the art as the Proban® process.

Alternative methods to flame retard cellulosic fibers and textiles suffer from a range of other shortcomings. For instance, these methods require harsh processing conditions and are based on raw materials with a high concentration of formaldehyde (>0.5% formaldehyde, % w/w). Moreover, the products applied in these methods have low stability, resulting in a short shelf-life. The application process for at least one known product requires low pH solutions (pH<4), oxidation baths, and multiple wash baths. The process also generates significant amounts of organic waste.

SUMMARY

Provided herein are polymers synthesized from hydroxymethylphosphorous compounds and polyfunctional nitrogenous- or hydroxyl-based compounds. In some embodiments, water-soluble, flame-retardant polymers synthesized from urea and tetrakis(hydroxymethyl)phosphonium chloride and methods for making and using the polymers are provided. In some embodiments, the water-soluble polymers described herein can impart flame retardant properties to natural and synthetic fibers and textiles without the need for post-application ammoniation and oxidation.

The details of one or more embodiments are set forth in the drawings and the description below. Other features, objects, and advantages will be apparent from the description and drawings, and from the claims.

In a first aspect, a polymer disclosed herein includes a plurality of repeat units of Formula IIx, Formula IIy, or Formula IIZ

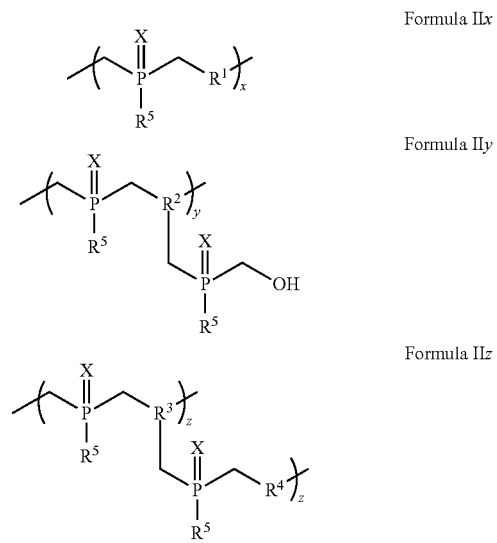

where each X in each repeat unit independently is oxygen or is absent; each $R^1$, $R^2$, $R^3$, and $R^4$ in each repeat unit independently is a residue of a linking monomer; and each $R^5$ in each repeat unit independently is hydroxymethyl, substituted or unsubstituted aryl, or substituted or unsubstituted linear or branched $C_1$-$C_{10}$ alkyl; where at least 20% of the phosphorus atoms in the polymer are present as phosphine oxide; and where the polymer is water soluble. In any example of the first aspect, at least 20%, at least 40%, at least 60%, at least 90%, at least 95%, at least 98%, or 100% of the phosphorus atoms in the polymer can be present as phosphine oxide. In any example, the linking monomer optionally can be a urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; aminoplast; substituted or unsubstituted phenol; substituted or unsubstituted resorcinol; substituted or unsubstituted furan; 4-aminophenol; a derivative thereof or a combination thereof. In some examples, $R^5$ is hydroxymethyl.

In examples the polymer optionally can include a plurality of repeat units of Formula IIy or Formula IIz. In some of those examples, the polymer includes a plurality of repeat units of Formula IIy and Formula IIz. Optionally, the polymer can include a plurality of repeat units of Formula IIY and a plurality of repeat units of Formula IIy and/or Formula IIz.

In any example of the first aspect, the linking monomer optionally can be a urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; aminoplast; or a derivative thereof, and the polymer includes a plurality of repeat units of Formula IIy or Formula IIz. Optionally, $R^5$ is hydroxymethyl, the linking monomer is urea, and the polymer includes a plurality of repeat units of Formula IIy and/or Formula IIz. Additionally or alternatively, the linking monomer optionally can be a substituted or unsubstituted phenol, substituted or unsubstituted resorcinol, substituted or unsubstituted furan, 4-aminophenol, or a derivative thereof, and the polymer includes a plurality of repeat units of Formula IIy and/or Formula IIz.

The polymer of the first aspect optionally includes a molar ratio of phosphorus atoms to linking monomer residues from 1:0.3 to 1:0.95, such as from 1:0.6 to 1:0.8. The polymer of the first aspect optionally has a number average molecular weight less than 1,000,000.

In a second aspect, a polymer disclosed herein includes a reaction product of a plurality of phosphorus-containing monomers comprising tetrakis(hydroxymethyl) phosphonium salts or tris(hydroxymethyl) phosphonium salts, where the tetrakis(hydroxymethyl) phosphonium salts or tris(hydroxymethyl) phosphonium salts are in equilibrium with their respective hydroxymethyl phosphines and formaldehyde; and a plurality of linking monomers that are capable of forming two or more covalent bonds with the phosphorus-containing monomers via condensation reactions with formaldehyde, where 20% of the phosphorus atoms in the polymer are present as phosphine oxide, and where the polymer is water soluble. In some examples, at least 40%, at least 60%, at least 90%, at least 95%, or at least 98%, or 100% of the phosphorus atoms in the polymer are present as phosphine oxide.

In any example of the second aspect, the plurality of linking monomers optionally can include urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; aminoplast; a derivative thereof, or combinations thereof. Optionally, the plurality of linking monomers include urea. In any example of the second aspect, the plurality of phosphorus-containing monomers optionally can include tetrakis(hydroxymethyl) phosphonium salts in equilibrium with their respective hydroxymethyl phosphines and formaldehyde. In any example of the second aspect, the plurality of linking monomers optionally can include substituted or unsubstituted phenol, substituted or unsubstituted resorcinol, substituted or unsubstituted furan, 4-aminophenol, a derivative thereof, or a combination thereof.

In any example of the second aspect, the polymer optionally includes a molar ratio of phosphorus-containing monomers to linking monomers is from 1:0.3 to 1:0.95, such as from 1:0.6 to 1:0.8. In any example, the polymer optionally is hyperbranched.

In a third aspect, a method of forming a phosphine oxide-containing polymer includes reacting a plurality of oligomers with a plurality of phosphorus-containing monomers to form an intermediate polymer; and oxidizing the intermediate polymer to form a phosphine oxide-containing polymer, where the oligomers comprise hydroxylmethyl phosphonium moieties and linking monomers; where the plurality of phosphorus-containing monomers comprises hydroxymethyl phosphonium salts in equilibrium with their respective hydroxymethyl phosphines and formaldehyde; where after the oxidation step at least 20% of the phosphorus atoms in the phosphine oxide-containing polymer are present as phosphine oxide; and where the phosphine oxide-containing polymer is water soluble. In any example of the third aspect, the molar ratio of total phosphorus atoms in the oligomers and the phosphorus-containing monomers to linking monomers in the reacting step is from 1:0.3 to 1:0.95.

In a fourth aspect, a method for forming a phosphine oxide-containing polymer includes reacting a plurality of phosphorus-containing monomers including hydroxymethyl phosphonium salts in equilibrium with their respective hydroxymethyl phosphines and formaldehyde, and a plurality of linking monomers that are capable of forming two or more covalent bonds with the phosphorus-containing monomers via condensation reactions with formaldehyde, to form an intermediate polymer; and oxidizing the intermediate polymer to form a phosphine oxide-containing polymer, where after the oxidation step at least 20% of the phosphorus atoms in the phosphine oxide-containing polymer are present as phosphine oxide; and where the phosphine oxide-containing polymer is water soluble. In any example of the fourth aspect, at least 20%, at least 40%, at least 60%, at least 90%, at least 95%, or at least 98%, or 100% of the phosphorus atoms in the phosphine oxide-containing polymer are present as phosphine oxide.

In any example of the fourth aspect, the molar ratio of phosphorus-containing monomers to linking monomers in the reacting step optionally is from 1:0.3 to 1:0.95, such as from 1:0.6 to 1:0.8. Optionally, the reacting step and the oxidizing step can be carried out in aqueous medium. In any example, the hydroxymethyl phosphonium salts optionally can include tetrakis(hydroxymethyl) phosphonium salt and the hydroxymethyl phosphines optionally can include tris (hydroxylemethyl) phosphine. Optionally, the reacting step is carried out in an aqueous medium, and the step of reacting includes heating the aqueous solution at a temperature between about 40° C. and about 120° C.

In any example of the fourth aspect, the step of oxidizing optionally can include adding a first charge of an oxidizing agent, adding a first charge of a base, and adding a second charge of the oxidizing agent. Optionally, the method further includes adding a second charge of the base, adding one or more additional charges of the oxidizing agent, and for each additional charge of oxidizing agent adding an additional charge of base. In any example, the linking monomer reacted in the polymerization step optionally can be a first charge, and the method further includes after the oxidation step adding a second charge of the linking monomer. In any example, the method optionally can further include after the oxidizing step desalting the reaction mixture. Optionally, the method is carried out in a single reaction vessel.

In a fifth aspect, disclosed herein is a method of imparting flame resistance to a substrate, where the method includes (a) contacting the substrate with a treating composition including a polymer according to any aspect disclosed herein; and (b) drying the substrate. In any example of the fifth aspect, contacting the substrate optionally includes immersing the substrate in the treating composition or spraying the treating composition onto the substrate. In any example, drying the substrate optionally can include heating the substrate. Optionally, the treating composition further includes a crosslinking agent, and the step of drying the fiber or textile further includes crosslinking the polymer. In any example, optionally the method does not comprise an oxidation step. In any example, the substrate optionally can include a fiber or textile. Also disclosed herein is a textile article treated by any method described herein.

DETAILED DESCRIPTION

Figures 1A, 1B, 1C:
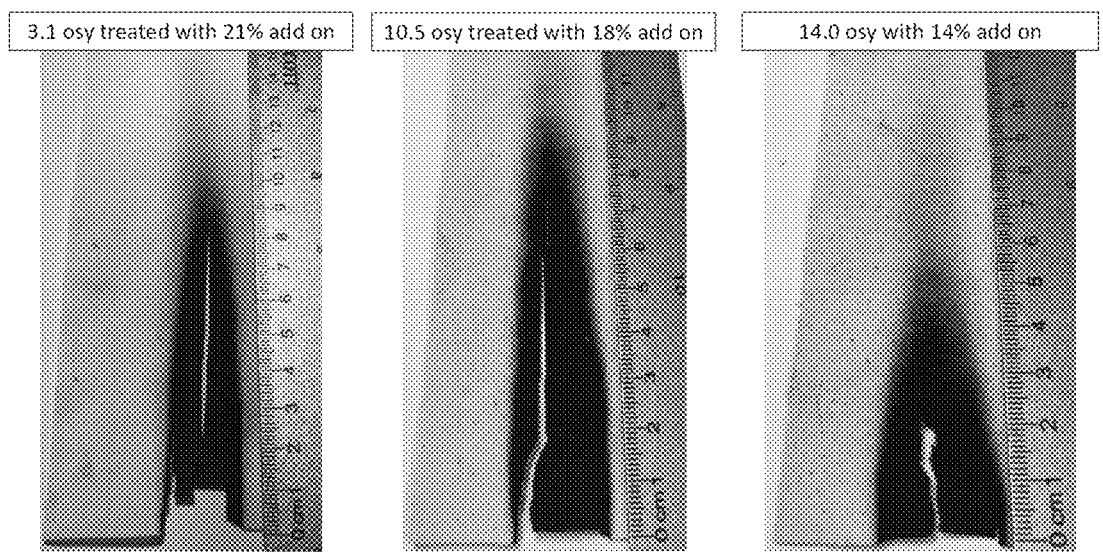
FIGS. 1A-C show photos of fabric samples treated with a water-soluble, phosphine oxide-containing polymer disclosed herein after flammability tests performed according to ASTM 6413.

Provided herein are water-soluble, phosphine oxide-containing polymers that include a plurality of repeat units, where the repeat units each include a phosphine oxide moiety and a linking moiety. The polymers can be formed by a controlled reaction of a plurality of hydroxymethyl phosphorus molecules with a plurality of linking monomers capable of forming two or more covalent bonds with the hydroxymethyl phosphorus molecules via a condensation reaction with formaldehyde, which is generated by the hydroxymethyl phosphorous molecules. The resulting polymers include phosphorus atoms, where a percentage of the phosphorus atoms in the polymers are present as phosphine oxide. As non-limiting examples, water-soluble polymers based on the reaction of one or more of tetrakis(hydroxymethyl)phosphonium, tris(hydroxymethyl)phosphine, tris(hydroxymethyl)phosphonium, and/or bis(hydroxymethyl) phosphine with urea are disclosed.

Also provided herein are formulations including the water-soluble, phosphine oxide-containing polymers. The polymers and formulations are useful to impart durable flame-retardant properties to substrates by application of the polymers to the substrates without the need for an ammonia curing step post-application and optionally without the need for a wash step post-application. In particular, the polymers and formulations are useful to impart durable flame-retardant properties to fibers and textiles, including natural fibers, such as cotton, wool, bamboo, jute, hemp, viscose, and other natural fibers. Further, the polymers and formulations are useful to impart durable flame-retardant properties to blends of natural and synthetic fibers. Alternatively, however, the polymers and formulations can be applied to other substrates, including primarily cellulosic substrates, such as lumber and engineered wood; polymeric substrates, such as polyvinyl chloride; and composite materials. Methods for making and using the polymers are also provided.

As used herein, the term "fiber" means, unless otherwise stated, any natural or synthetic polymer suitable for producing textiles. Examples of fibers include, without limitation, ramie, linen, cellulosic strands such as cotton or hemp, synthetic filaments such as polyester, nylon, rayon and polyolefin, animal-derived strands such as wool and silk, and other such filamentous strands. A fiber may be continuous or of indefinite length. As used herein, the term "textile" means, unless otherwise stated, any combination of fibers, including but not limited to woven, non-woven, or knitted. Non-limiting examples of textiles include threads, yarns, fabrics, and cloths.

Polymers and formulations described herein may be applied to fibers or textiles along with additional components. The fibers or textiles may be in any form at the time of application, for example, as single fibers, yarn, thread, fabric, cloth, or a garment. Optionally, the method of applying the polymers and/or formulations may include adding one or more additional compounds to impart other properties, such as flame-retardation, stain/soil resistance, water/oil resistance, or other properties. Selection of components is within the skill of the art and may be based on considerations such as cost, availability, stability and shelf-life, compatibility with fibers, textiles, fabrics or other components, environmental concerns, or other considerations.

I. POLYMERS

Disclosed herein are water-soluble, phosphine oxide-containing polymers including repeat units of Formula I.

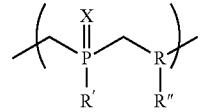

Formula I where X is absent or is oxygen; R is a residue of a linking monomer as described herein; R' is hydroxymethyl, alkyl, aryl, a residue of one linking monomer as described herein, or a side chain including at least one repeat unit that includes a residue of a linking monomer and a residue of a phosphorus-containing monomer or a derivative thereof; R" is absent, is a residue of one phosphorus-containing monomer or a derivative thereof, or is a side chain including at least one repeat unit that includes a residue of a linking monomer and a residue of a phosphorus-containing monomer or a derivative thereof; and where X, R, R' and R" can be different in different repeat units. At least 20% of the phosphorus atoms in the polymer are present as phosphine oxide moieties (where X is oxygen); thus, the polymers are sometimes referred to herein as phosphine oxide-containing polymers or phosphine oxide-based polymers. In all embodiments, the polymers are water-soluble. Water-soluble, as used herein, means the polymer dissolves in water to give a solution with a concentration of at least 50 g/liter at room temperature.

The polymers disclosed herein can be reaction products of (1) a plurality of phosphorous-containing monomers that are hydroxymethyl phosphonium salts in equilibrium with their corresponding hydroxymethyl phosphines and (2) a plurality of linking monomers capable of forming two or more covalent bonds with the phosphorus-containing monomers via condensation reactions with formaldehyde.

The phosphorous-containing monomers that can be used to form the phosphine oxide-containing polymers disclosed herein generally can be represented by compounds shown in Scheme I.

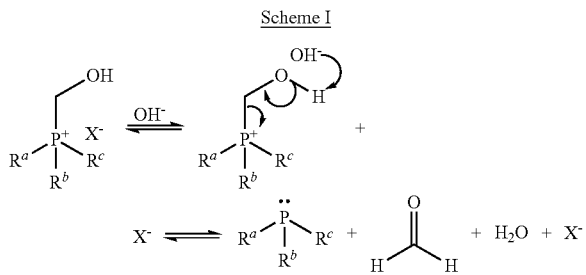

Scheme I where $R^a$, $R^b$, and $R^c$ independently are hydroxymethyl, substituted or unsubstituted aryl, or substituted or unsubstituted linear or branched $C_1$-$C_{10}$ alkyl, provided at least two of $R^a$, $R^b$, and $R^c$ are hydroxymethyl; and $X^-$ is any anion that balances the charge on the phosphorus of the phosphonium salt. The anion $X^-$ may be monovalent, divalent, or trivalent. The $OH^-$ may be provided by any strong base, such as sodium hydroxide, potassium hydroxide, or calcium hydroxide, but alternatively could be provided by a weak base in an aqueous solution that generates some mole fraction of hydroxide in solution. For ease of discussion, unless specifically noted otherwise, the term hydroxymethyl phosphonium salt is intended to refer to the salt in equilibrium with its corresponding hydroxymethyl phosphine and formaldehyde according to Scheme I. Thus, when the phosphorus-containing monomer is referred to as a hydroxymethyl phosphonium salt, it should be understood that the hydroxymethyl phosphonium salt, its corresponding hydroxymethyl phosphine, and formaldehyde are all present.

The hydroxymethyl phosphonium salts may be tetrakis (hydroxymethyl) phosphonium salts and/or tris(hydroxymethyl) phosphonium salts. For a tetrakis(hydroxymethyl) phosphonium salt, $R^a$, $R^b$, and $R^c$ in Scheme I are all hydroxymethyl. For a tris(hydroxymethyl) phosphonium salt, two of $R^a$, $R^b$, and $R^c$ in Scheme I are hydroxymethyl and one of $R^a$, $R^b$, and $R^c$ is alkyl or aryl. While the prefix "tetrakis" is used herein when naming certain chemical compounds, the variant "tetra" has the same meaning as "tetrakis" and is also used in the art. For all salts, an anion will be present as a counterion to the cationic phosphonium group. Non-limiting examples of these anions include but are not limited to chloride, acetate, and sulfate. The corresponding hydroxymethyl phosphines may be, for example, trishydroxymethyl phosphines and/or bishydroxymethyl phosphines. The linking monomers disclosed herein are capable of forming two or more covalent bonds with the phosphorus-containing monomers through condensation reactions with formaldehyde.

The linking monomers disclosed herein include two or more reactive sites capable of reacting with formaldehyde. As one example, the two or more reactive sites can include one or more nitrogen atoms. Examples of useful linking monomers that include such reactive nitrogens include urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; and derivatives thereof. As another example, the linking monomer optionally can be an aminoplast, such as but not limited to a urea-formaldehyde resin or a melamine-formaldehyde resin. In still other examples, the two or more reactive sites can include one or more oxygens, such as the oxygen of a hydroxyl group. Examples of useful oxygen-containing linking monomers include substituted or unsubstituted phenols, substituted or unsubstituted resorcinols, and substituted or unsubstituted furans. In further examples, monomers with both nitrogen moieties and oxygen moieties can be used, such as 4-aminophenol. Optionally, one of the two or more reactive sites on a linking monomer can be unreactive until another site reacts. For example, in the case of phenol, the oxygen is reactive with a first phosphorus containing monomer, and after that reaction the 2, 4, or 6 carbon can react with a second phosphorus-containing monomer. In all embodiments, the linking monomer is capable of forming two or more covalent bonds with two or more phosphorus-containing monomers.

As a non-limiting example of a reaction between a phosphorus-containing monomer and a linking monomer, Scheme II shows the steps in the reaction of tetrakis(hydroxymethyl) phosphonium chloride ("THPC") with urea.

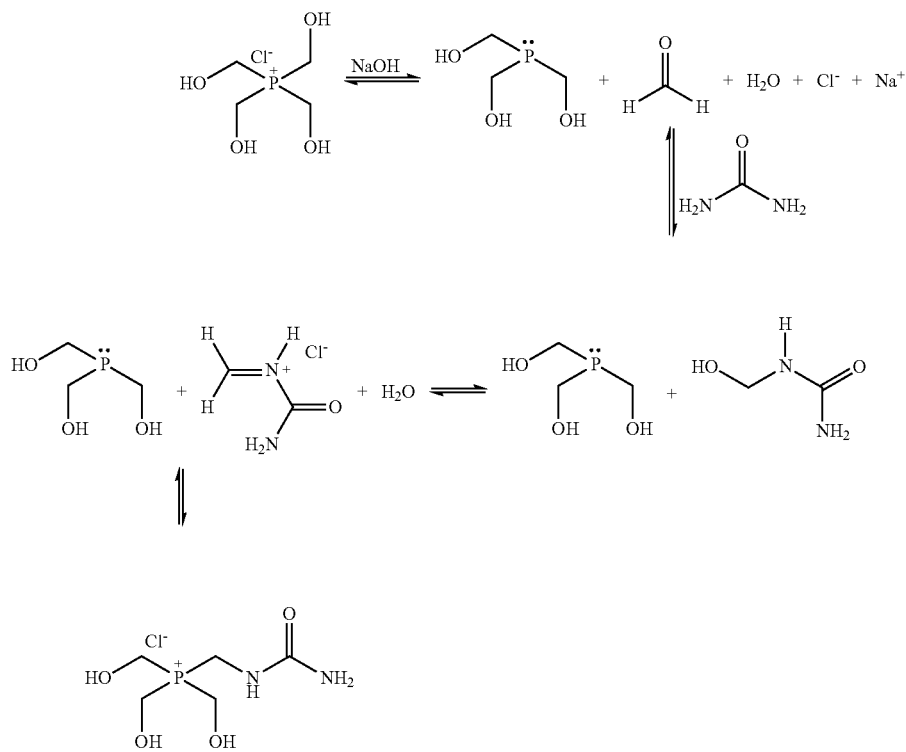

Each linking monomer can form two or more covalent bonds with phosphorus-containing monomers, i.e., one covalent bond with each of two or more phosphorus-containing monomers. Accordingly, the polymers disclosed herein include any or all of the repeat units shown in Formula II and may include additional repeat units.

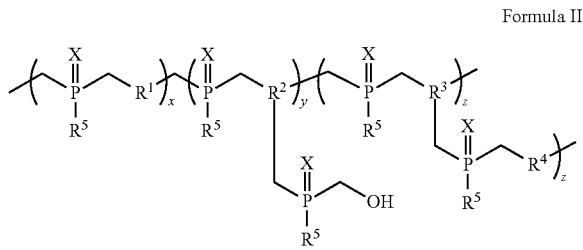

Formula II

In Formula II, each repeat unit (x, y, and z) may be present or absent, provided at least one is present, and the repeat units may be randomly distributed throughout the polymer. Also in Formula II, each X in each repeat unit independently is oxygen or is absent, provided at least 20% of the phosphorus atoms in the polymer are present as phosphine oxides (i.e., at least 20% of the X's are oxygen). As will be apparent from X independently being oxygen or absent, the phosphorus atoms for the repeat units in Formula II may be in the 3+ oxidation state (phosphine, with X absent) or the 5+ oxidation state (phosphine oxide, with X=oxygen). The phosphine and phosphine oxide moieties may be randomly distributed throughout the polymer. The percent of phosphorus atoms in the 5+ oxidation state is 20% or more of the total phosphorus atoms in the polymer. In addition to phosphorus present as phosphine and phosphine oxide moieties, in some embodiments, the polymer may include a small percentage of phosphorus present as phosphonium moieties.

Also in Formula II, each of $R^1$, $R^2$, $R^3$, and $R^4$ independently is a residue of a linking monomer as disclosed herein or a combination thereof. The polymerization reaction may be carried out using one or more different linking monomers as disclosed herein, and thus in different repeat units, $R^1$ (or $R^2$, $R^3$, or $R^4$) may be a different linking monomer residue. In some embodiments, each of $R^1$, $R^2$, $R^3$, and $R^4$ independently is a residue of a urea; thiourea; cyclic urea; cyclic thiourea; substituted or unsubstituted 1,3,5-triazine-2,4,6-triamine; dicyandiamide; 6-methyl-1,3,5-triazine-2,4-diamine; substituted or unsubstituted aniline; urea-formaldehyde resin; melamine-formaldehyde resin; substituted or unsubstituted resorcinol; substituted or unsubstituted furan; substituted or unsubstituted phenol; or a derivative or combination thereof. One skilled in the art understands that a residue of a particular compound or functional group for each of $R^1$, $R^2$, $R^3$, and $R^4$ will differ in structure from that compound or functional group by having at least two fewer hydrogens due to attachment of the compound or functional group within the polymer backbone.

Also in Formula II, each $R^5$ in each repeat unit independently is hydroxymethyl, substituted or unsubstituted aryl, or substituted or unsubstituted linear or branched $C_1$-$C_{10}$ alkyl. For example, if the repeat unit is derived from a tetrakis (hydroxymethyl)phosphonium salt monomer, $R^5$ will be hydroxymethyl, and if the repeat unit is derived from a tris (hydroxymethyl)phosphonium salt monomer, $R^5$ will be substituted or unsubstituted alkyl or aryl. In some embodiments, $R^5$ is methyl, ethyl, n-propyl, isopropyl, n-butyl, isobutyl, tertbutyl, n-pentyl, n-hexyl, cyclohexyl, n-heptyl, n-octyl, n-nonyl, n-decyl, or an isomer thereof.

Further, in Formula II, subscripts x, y, and z represent the mole fractions of the shown repeat units in the final polymer. Any of x, y, and z can be zero, provided at least one of x, y, and z is non-zero. Repeat units x, y, and z are randomly distributed throughout the polymer. Linking monomers with three or more reactive groups can form repeat units y or z. Repeat unit y has a single phosphorus-containing monomer residue side chain, while repeat unit z has a side chain that includes one or more repeat units that each include a residue of a linking monomer and a residue of a phosphorus-containing monomer or a derivative thereof. Each repeat unit z can have a different number of repeat units in the side chain, and each side chain can be polymeric. Repeat unit z gives the polymer a hyperbranched structure.

In each repeat unit having the structure of Formula IIx,

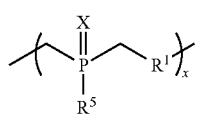

Formula II$_x$ each X may be either oxygen or absent. Thus, Formula IIx includes repeat units m and/or n,

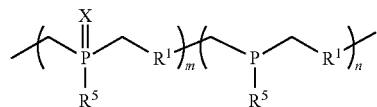

where $R^1$, $R^5$, and x are defined above for Formula II; where m and n independently are any number from 0 to x, provided m+n=x; and where the repeat units m and n are randomly distributed throughout the polymer of Formula II.

In each repeat unit having the structure of Formula IIy,

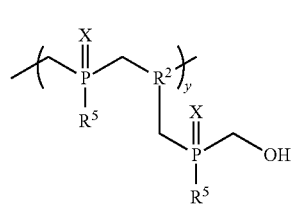

Formula II$y$ each X may be either oxygen or absent. Thus, Formula IIy includes repeat units o, p, q, and/or r,

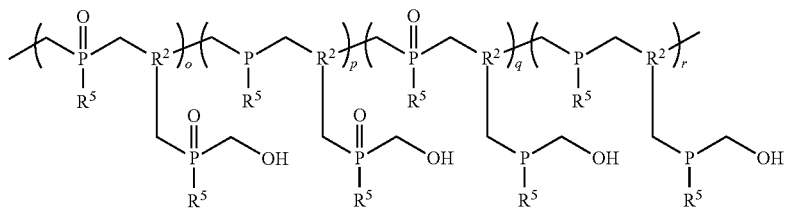

where $R^2$, $R^5$, and y are defined above for Formula II; where o, p, q, and r can be any number from 0 to y, provided o+p+q+r=y; and where the repeat units o, p, q, and r are randomly distributed throughout the polymer of Formula II.

In each repeat unit having the structure of Formula IIz,

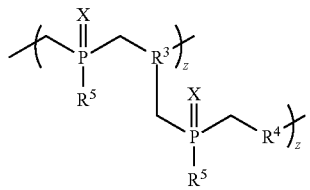
Formula IIz each X may be either oxygen or absent. Thus, Formula IIz includes repeat units s, t, u, and/or v,

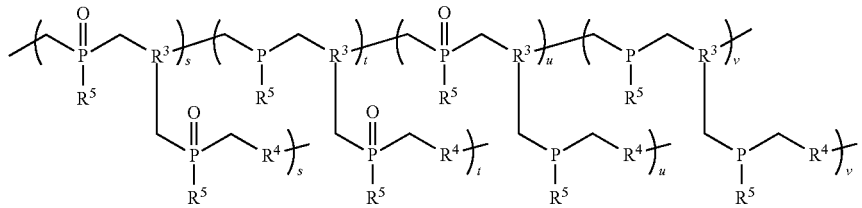

where $R^3$, $R^4$, $R^5$, and z are defined above for Formula II; where s, t, u, and v can be any number from 0 to z, provided s+t+u+v=z; and where the repeat units s, t, u, and v are randomly distributed throughout the polymer of Formula II.

The repeat units of Formula II show the linking monomer as the only branching point. That is, the repeat units of Formula II correspond to Formula I where R' is hydroxymethyl, aryl, or alkyl. It is possible, however, for the phosphorus-containing monomer to react with more than one linking monomer. Such reaction can form a repeat unit with a branch at the phosphorus-containing monomer, resulting in a structure consistent with Formula I where R' is a residue of one linking monomer as described herein or where R' is a side chain including at least one repeat unit that includes a residue of a linking monomer and a residue of a phosphorus-containing monomer or a derivative thereof. Examples of repeat units having branching points at the phosphorus-containing monomer are shown in Formula III.

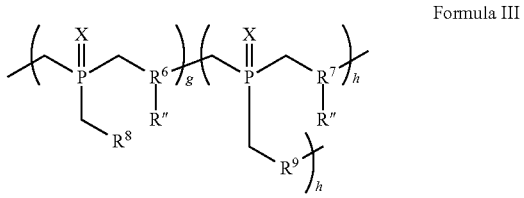
Formula III

In Formula III, R" is defined as above for Formula I and each of $R^6$, $R^7$, and $R^8$ independently is a residue of a linking monomer as disclosed herein, a derivative thereof, or a combination thereof. That is, in different repeat units each $R^6$ (or $R^7$ or $R^8$) may be a residue of a different linking monomer or derivative thereof. Also in Formula III, $R^9$ is a side chain including at least one repeat unit that includes a residue of a linking monomer and a residue of a phosphorus-containing monomer or a derivative thereof. Each $R^9$ may have a different number of repeat units.

Optionally, a water-soluble, phosphine oxide-containing polymer of Formula II, can further include repeat units g and/or h of Formula III randomly distributed throughout the polymer. In the water-soluble, phosphine oxide-containing polymer, each X in each repeat unit shown in Formula II or III independently is oxygen or is absent, provided at least 20% of X in the polymer are oxygen. In some embodiments, at least 40%, at least 60%, at least 90%, at least 95%, at least 98%, or 100% of X in the polymer are oxygen.

The polymerizations described herein are carried out with a stoichiometric imbalance with the phosphorus-containing monomer in excess relative to the linking monomer. Typical molar ratios of phosphorus-containing monomer to linking monomer range from 1:0.3 to 1:0.95, optionally from 1:0.6 to 1:0.8. This stoichiometric imbalance contributes to achieving a water-soluble polymer. Also, with an excess of phosphorus-containing monomer, all or a majority of branch points in the polymer will be at a linking monomer as shown in Formula II. Thus, the repeat units of Formula II are the dominant structures in the polymers described herein, and in some embodiments, a polymer disclosed herein includes a plurality of repeat units of Formula IIx and a plurality of repeat units of Formula IIy or Formula IIz. However, in some embodiments, the polymers disclosed herein will include as minor components repeat units having branch points at the phosphorus-containing monomer as shown in Formula III.

In one non-limiting example, the phosphorus-containing monomer is tetrakis(hydroxymethyl) phosphonium chloride and the linking monomer is urea. In these examples, Formula II can be represented by Formula IIA:

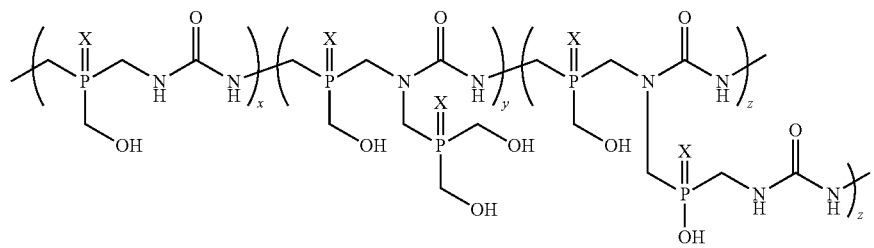

Formula IIA

In Formula IIA, each X independently is oxygen or is absent, provided at least 20% of the phosphorus atoms in the polymer are present as phosphine oxides (i.e., X is oxygen). As will be apparent from X independently being oxygen or absent, the phosphorus atoms for the polymer in Formula I may be in the 3+ oxidation state (phosphine, with X absent) or the 5+ oxidation state (phosphine oxide, with X=oxygen). The percent of phosphorus atoms in the 5+ oxidation state is 20% or more of the total phosphorus atoms in the polymer. In some embodiments, the percent of phosphorus atoms in the polymer that are in the 5+ oxidation state is at least 40%, at least 60%, at least 90%, at least 95%, at least 98%, or 100%.

In Formula IIA, the subscripts x, y, and z represent the mole fractions of the repeat units in the polymer. Repeat units x, y, and z are randomly distributed throughout the polymer shown in Formula IIA, which may include repeat units in addition to those shown in Formula IIA. Due to the possibility of a polymeric side chain on repeat unit z, the polymer may have a hyperbranched structure. Polymers of Formula IIA are water-soluble.

In some embodiments, a polymer disclosed herein has at least 20% of the phosphorous atoms of the polymer present as phosphine oxides (i.e., pentavalent phosphorus). Optionally, at least 40%, at least 60%, at least 90%, at least 95%, at least 98%, or 100% of the phosphorous atoms of the polymer are present as phosphine oxides.

Optionally, the polymers described herein can be hyperbranched. As used herein, "hyperbranched" refers to a polymer that has a dendritic structure that is intentionally engineered through monomer functionality. A hyperbranched polymer typically includes trifunctional (or more than trifunctional) monomers. A di-functional monomer can form only two covalent bonds with other monomers to form a linear segment. A monomer that is at least trifunctional can form three or more covalent bonds with other monomer units, and thus can be used to intentionally integrate a dendritic or hyperbranched architecture into the polymer.

As one non-limiting example of distinguishing linear monomer units from branched monomer units, each nitrogen of a urea monomer can react twice, so a urea monomer includes four reactive sites and can form four covalent bonds with the phosphorus-containing monomers described herein.

If a urea monomer forms covalent bonds with only two phosphorus-containing monomers, those bonds are part of the polymer backbone, and the urea monomer unit is a linear unit. If a urea monomer forms covalent bonds with more than two phosphorus-containing monomers, the additional bonds form branches and the urea monomer unit is a branching unit. Branching units may be randomly distributed throughout the backbone of the polymer. To provide a water-soluble polymer as disclosed herein, the number of branching units must be limited. Monomers with functionalities greater than two can lead to effectively infinite molecular weights during polymer synthesis, yielding an insoluble network polymer.

The polymers disclosed herein are water-soluble. In some embodiments, water-solubility may be achieved by controlling the molecular weight of the polymer by controlling the length of the polymer backbone and/or the degree of branching. The molecular weight where a polymer becomes insoluble will vary depending on the exact chemical make-up of the polymer backbone. In some embodiments, a polymer disclosed herein has a number average molecular weight of no more than 1,000,000 (e.g., up to 1,000,000, up to 750,000, up to 500,000, up to 100,000, or between 1000 and 100,000).

The polymerization of the phosphorus-containing monomers and the linking monomers described herein is a step-growth polymerization and both the phosphorus-containing monomer and the linking monomer may have three or more reactive positions. Thus, the phosphorus oxide-based polymers described herein have a polydispersity greater than two.

II. METHODS OF MAKING THE POLYMERS

The compounds described herein can be synthesized using various synthetic methods. At least some of the steps of these methods are known in the art of synthetic organic chemistry. The compounds described herein can be prepared from readily available starting materials. Optimum reaction conditions can vary with the particular reactants or solvent used, but such conditions can be determined by one skilled in the art.

Reactions to produce the compounds described herein can be carried out in solvents, which can be selected by one of skill in the art of organic synthesis. Reactions can be carried out in one solvent or a mixture of more than one solvent. Due to costs and environmental issues, water is generally preferred as the solvent, though other solvents can additionally or alternatively be used depending on the reactivity and solubility of the monomers used. The method results in a water-soluble phosphine oxide-based polymer independent of whether either or both the polymerization and the post-polymerization reactions are carried out in an aqueous medium. The aqueous medium can further contain additional components to enhance solubility, for instance organic solvents, dispersants, surfactants, and the like.

Product or intermediate formation can be monitored according to any suitable method known in the art. For example, bond formation may be monitored by spectroscopic means, such as nuclear magnetic resonance spectroscopy (e.g., $^1$H or $^{31}$P), infrared spectroscopy, or UV-visible light spectroscopy. Furthermore, chromatographic methods may be used to analyze the product or intermediates such as high performance liquid chromatography (HPLC), gel permeation chromatography (GPC), or thin layer chromatography. Additionally, product formation can be monitored by measuring the polymer molecular weights by methods known to those of skill in the art, such as dynamic light scattering, viscosity, or GPC.

Disclosed herein are methods for making water-soluble phosphine oxide-containing polymers that are useful as flame retardants for substrates, including but not limited to fibers, fabrics, and textiles. In some embodiments, a method for making a phosphine oxide-containing polymer disclosed herein includes (a) polymerizing a plurality of phosphorus-containing monomers as disclosed herein with a plurality of linking monomers as disclosed herein to form an intermediate polymer, and (b) oxidizing the intermediate polymer to convert 20% or more of the phosphorus atoms in the polymer to phosphine oxide to form a phosphine oxide-containing polymer, provided the phosphine oxide-containing polymer is water-soluble. Step (a) and step (b) optionally can be carried out sequentially in the same reaction vessel.

The phosphorus-containing monomers used in the method can be tetrakis(hydroxymethyl) phosphonium salts and/or tris(hydroxymethyl) phosphonium salts in equilibrium, where the salt is in equilibrium with its respective hydroxymethyl phosphine and formaldehyde. The linking monomers used in the method may be any described herein and in some embodiments are urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; aminoplasts, such as but not limited to a urea-formaldehyde resin or a melamine-formaldehyde resin; substituted or unsubstituted phenol; substituted or unsubstituted resorcinol; substituted or unsubstituted furan; an amino alcohol, such as but not limited to 4-aminophenol; derivatives thereof or combinations thereof.

Scheme III shows an example of a reaction scheme for forming a water-soluble, phosphine oxide-containing polymer as disclosed herein using tetrakis(hydroxymethyl) phosphonium chloride as the phosphorus-containing monomer and urea as the linking monomer:

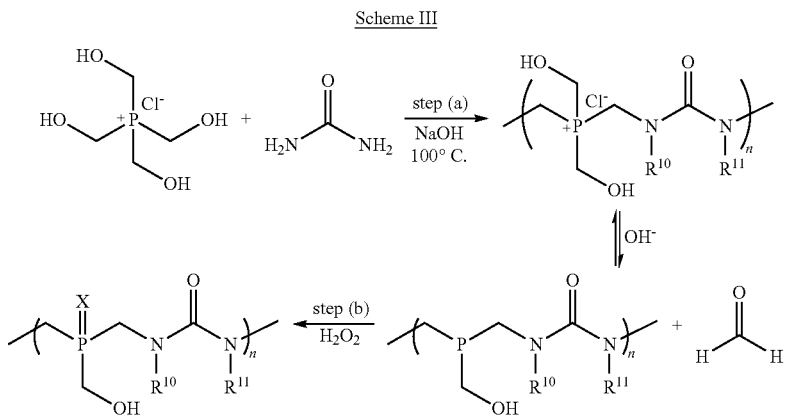

Scheme III where the Cl⁻ anion balances the charge on the phosphonium; where each X independently is oxygen or is absent, provided at least 20% of the phosphorus atoms in the polymer are present as phosphine oxides (i.e., X is oxygen); and where $R^{10}$ and $R^{11}$ independently are hydrogen, a residue of the tetrakis(hydroxymethyl) phosphonium chloride or a derivative thereof, or a side chain including at least one repeat unit that includes a residue of the tetrakis(hydroxymethyl) phosphonium chloride monomer or derivative thereof and a residue of the urea monomer. Derivatives of tetrakis(hydroxymethyl) phosphonium chloride include phosphonium species and phosphine oxide species that can result from the reaction steps shown in Scheme III. In the intermediate polymer produced by polymerization step (a), the phosphorus atoms are predominantly present in phosphonium species under acidic conditions and as phosphine species under basic conditions. Oxidation in step (b) converts a portion of the phosphine species to phosphine oxide species.

The polymerization step (a) of the methods described herein is a step-growth polymerization, and thus proceeds by formation of dimers, then trimers and oligomers, and finally the oligomers combine to form polymers. Thus, in some embodiments, instead of reacting individual phosphorus-containing monomers and linking monomers, the inventive polymers can be formed by polymerizing an oligomer formed from one or more phosphorus-containing monomers and one or more linking monomers as described herein. As non-limiting examples, oligomers of hydroxymethyl phosphonium salts and urea are commercially available as Pyrovatex ACS (available from Huntsman Corp.), THP sulfate ("THPS")-urea precondensate, and THPC-urea precondensate (available from Specialty Materials Company). Any of these or other oligomers of phosphorus-containing monomers and linking monomers described herein could be reacted with each other and with additional linking monomer using methods disclosed herein to form an intermediate polymer disclosed herein. Then those intermediate polymers can be converted to phosphine oxide-containing polymers using methods disclosed herein.

Thus, in some embodiments, a method for making a phosphine oxide-based polymer described herein includes (a) polymerizing a plurality of phosphorus-containing oligomers to form an intermediate polymer, wherein each phosphorus-containing oligomer includes a plurality of repeat units each including a hydroxymethyl phosphonium salt residue or derivative thereof and a linking monomer residue; and (b) oxidizing the intermediate polymer to convert 20% or more of the phosphorus atoms in the polymer to phosphine oxide form to form a phosphine oxide-based polymer, wherein the phosphine oxide-based polymer is water-soluble. The step of polymerizing the plurality of phosphorus-containing oligomers may include reacting two or more phosphorus-containing oligomers with each other, reacting the plurality of phosphorus-containing oligomers with phosphorus-containing monomers, and/or reacting the plurality of phosphorus-containing oligomers with linking monomers.

In a polymerization step where phosphorus-containing monomers react with linking monomers to form the intermediate polymer, the monomers optionally can be provided in a molar ratio of phosphorus-containing monomer (combined phosphonium salt/phosphine) to linking monomer of from 1:0.3 to 1:0.95, optionally 1:0.6 to 1:0.8. In a polymerization step involving polymerizing an oligomer, the ratio of phosphorus-containing monomer to linking monomer present in the oligomer can be determined, and if it is not within the desired range, additional phosphorus-containing monomer or linking monomer can be added as needed to provide the desired stoichiometric ratio of phosphorus-containing monomer to linking monomer.

At the disclosed ratios, the phosphorus-containing monomer is present in stoichiometric excess relative to the linking monomer. The specific stoichiometric excess can be selected to provide a desired molecular weight and/or polydispersity to ensure the final phosphine oxide-containing polymer is water soluble. The desired amount of stoichiometric excess for the phosphorus-containing monomer can be selected based on a number of factors, including the number of reactive sites on the phosphorus-based monomer, the number of reactive sites on the linking monomer, the relative reactivity of the linking monomer at these reactive sites, the effect of monomer substituents through electronic or steric effects, along with other factors commonly known to those practiced in polymer synthesis.

In addition to influencing molecular weight and polydispersity by selecting stoichiometric balance/imbalance, molecular weight and polydispersity can be influenced by tailoring reaction conditions. The reaction conditions that affect molecular weight and/or polydispersity include concentration of monomers in solution, pH, reaction temperature, reaction time, and other factors known to those of skill in the art.

The polymerization step (a) optionally can include adjusting the pH to a level that enhances the rate of the reaction. The desired pH will depend on the chemical properties of the monomers employed. The pH can be adjusted by adding acids or bases typically used in polymer synthesis reactions. For example, the pH can be decreased by adding acids such hydrochloric acid, sulfuric acid, phosphoric acid, nitric acid, hydrobromic acid, hydroiodic acid, acetic acid, citric acid, boric acid, phosphonic acid, phosphinic acid, or other acids. As another example, the pH can be increased by adding hydroxide salts, oxide salts, acetate salts, citrate salts, carbonate salts, borate salts, silicate salts, phosphate salts, ammonia, amines, or other bases. The pH optionally can be adjusted to 2 to 9, (e.g., 4 to 9, 5 to 8, or 6 to 7). Optionally, the pH can be adjusted to about neutral pH. As used herein, the term "neutral pH" means, unless otherwise stated, a pH of about 7.0, but includes variations of at least several tenths above or below 7.0 which may result throughout the reaction step. Optionally, the pH is adjusted to a desired level for the reaction after addition of the phosphorous-containing monomer and prior to addition of the linking monomer.

The polymerization step (a) optionally can be carried out in an aqueous medium. The polymerization step (a) optionally can be carried out at a temperature between about 5° C. and about 120° C. (e.g., between about 40° C. and about 120° C., between about 85° C. and about 110° C., or between about 90° C. and about 101° C.). The polymerization step (a) optionally can be carried out in aqueous medium. In one example, when the polymerization is carried out in an aqueous medium, the aqueous medium optionally can be heated at reflux. Alternatively, the reaction step optionally can be carried out in an organic solvent, or in a combination of aqueous and organic solvents. Optionally, the heating step may be carried out by heating the solvent at the reflux temperature of the organic solvent or mixture of solvents. To conduct the polymerization step (a) at temperatures greater than the boiling point of water (100° C.), the reaction is conducted in a pressurized vessel.

The polymerization step (a) optionally can be carried out at atmospheric pressure, or can be carried out under about 1 psi to about 10 psi pressure over atmospheric pressure (e.g., from about 1 to about 8 psi, or from about 2 to about 5 psi pressure).

While stoichiometric ratios and reaction conditions can be selected to target a desired molecular weight, the polymerization reaction also can be monitored and the polymerization stopped once a desired molecular weight is achieved. Regarding polymerization time, in some embodiments, the polymerization step is carried out for 0.25 to 24 hours (e.g., 2 to 18 hours, 4 to 10 hours). The polymerization step optionally can be carried out until the polymer's number average molecular weight is 1,000,000 Da or less. Any standard method for monitoring polymer molecular weight may be used including gel permeation chromatography (GPC), dynamic light scattering (DLS), matrix assisted laser desorption/ionization (MALDI), vapor pressure, osmotic pressure, viscosity as well as other methods commonly known to those practiced in polymer synthesis. In some embodiments, the number average molecular weight of the polymer may reach up to 1,000,000 Da. In some embodiments, the polymer has a polydispersity greater than two.

Once a desired molecular weight of the intermediate polymer is achieved, the intermediate polymer is oxidized in step (b) to partially or fully convert phosphorus atoms in the intermediate polymer from phosphine to phosphine oxide, provided at least 20% of the phosphorus atoms in the final polymer are present as phosphine oxide. This is accomplished by addition of an oxidizing agent. The oxidation step increases the oxidation state of the phosphorous atom and disrupts further polymerization by preventing further release of formaldehyde from the phosphorus-containing monomer. This post-polymerization oxidation reaction therefore can be used to mediate molecular weight. Because limiting molecular weight at least partly contributes to solubility of the phosphine oxide-containing polymers by inhibiting further polymer growth, polymers of desired solubility may be obtained by employing this post-polymerization oxidation reaction at an appropriate time during the polymerization step.

The oxidation step (b) includes adding an oxidizing agent to the reaction medium and optionally further includes adding a base to the reaction medium after the addition of the oxidizing agent. Alternatively, the oxidizing agent and the base can be added to the reaction medium at the same time. As a further optional step, additional oxidizing agent can be added after the base is added.

Addition of the oxidizing agent causes the pH of the reaction mixture to drop. In some embodiments, after addition of the oxidizing agent, the reaction mixture will have an acidic pH (i.e., <7.0). Addition of the base raises the pH, for example to approximately neutral. In some examples, the oxidizing agent and base can be added simultaneously, but in other examples, the oxidizing agent and base are added sequentially. Optionally, multiple additions of the oxidizing agent and base may be used, with each addition of oxidizing agent and base being either simultaneous or sequential. As one example, a first charge of oxidizing agent may be added followed by a first charge of base, followed by a second charge of oxidizing agent, and then a second charge of base. In some examples, the post-polymerization reactions include alternating more than two charges of an oxidizing agent with more than two charges of base. In some of those examples, from 3 to 10 charges of an oxidizing agent and from 3 to 10 charges of a base can be added to the aqueous medium in an alternating manner. Optionally, at least 4 charges of an oxidizing agent and at least 4 charges of a base can be added to the aqueous medium. Where multiple charges of an oxidizing agent and a base are provided, each charge of an oxidizing agent is typically followed by a charge of a base. A charge can be any addition of the chemical, including one time addition, a semi-continuous or continuous feed over time, or any other method of introducing the chemical to the reaction. The procedure alternating oxidizing agent and base can be carried out until the desired percentage of phosphorus atoms are converted to phosphine oxides. The amount of oxidizing agent and base added to the reaction in each charge should be sufficiently small to avoid abrupt changes in pH, which could undesirably accelerate the polymerization and yield an insoluble intermediate polymer.

Non-limiting examples of useful oxidizing agents include peroxides such as hydrogen peroxide; compounds such as sulfur dioxide, nitric acid, peracetic acid, oxygen, and ozone; and ions such as manganate, permanganate, chromate, dichromate, perborate, and hypochlorite. Non-limiting examples of useful bases include hydroxides such as sodium hydroxide and magnesium hydroxide, and other compounds such as sodium amide, lithium diethylamide, amines, conjugate bases of acidic compounds, and soda ash.

In some examples, a first charge of an oxidizing agent is added in an amount of 0.05 to 0.4 molar equivalents relative to the phosphorus concentration in the aqueous medium. In some examples, a first charge of a base can be added in an amount of 0.05 to 0.4 molar equivalents relative to the phosphorus concentration in the aqueous medium. The first charge of an oxidizing agent can be added in an amount different from that of the second or any subsequent charge of an oxidizing agent. Similarly, the first charge of a base can be added in an amount different from that of the second or any subsequent charge of a base.

The methods for making a water-soluble phosphine oxide-based polymer described herein can optionally include a desalting step after the oxidation step. As one example, the desalting step can be accomplished by membrane filtration, for example microfiltration nanofiltration, or reverse osmosis. In some examples, when the method includes a desalting step, the phosphine oxide based-polymer produced by the method can be applied to a substrate without a washing step after the application.

The methods for making a water-soluble phosphine oxide-based polymer described herein can optionally include adding linking monomers to the reaction mixture after the oxidation step. Thus, the linking monomer added in the polymerization step may be a first charge, and the method may further include after the oxidation step adding a second charge of the linking monomer to the aqueous medium. The additional linking monomer can scavenge formaldehyde byproduct of the polymerization reaction, thereby reducing the potential hazards of a formaldehyde-rich solution. With higher percentages of phosphorus oxidation (>90%), charges of linking monomer after oxidation step (b) typically do not increase the molecular weight and branching of the polymer. When an additional charge of linking monomer is used, the charge of linking monomer after the oxidation step is an amount lower than that of the charge of linking monomer in the polymerization step (or if an oligomer is used in the polymerization step, lower than the equivalent amount of linking monomer). When an additional charge of linking monomer is used, the linking monomer used in the post-oxidation step may be the same or a different chemical compound than the linking monomer used in the polymerization step.

Due to pH fluctuations during the polymerization and post-polymerization reaction, a step of adjusting the pH may precede one or more additional charges of linking monomer. For instance, the pH may optionally be adjusted to 7-10 (e.g., 8.5-9.5). The additional steps optionally included in the method may also be carried out in an aqueous medium and in the same reaction vessel as the polymerization reaction or in a different reaction vessel. The reaction may remain heated at reflux during addition of the second charge of linking monomer and/or the pH adjustment.

Without wishing to be bound by theory, it is believed that formaldehyde presence in the final polymer is limited by at least three different chemistries in the methods. First, the step of oxidizing the polymer stops polymerization and prevents further release of formaldehyde from hydroxymethyl groups bound to the phosphorus atoms. Second, the oxidant used in the oxidation step can convert formaldehyde to formic acid and/or its conjugate base. Where the formaldehyde consumes oxidant, additional oxidant may be needed to ensure formation of the desired percentage of phosphine oxide. Third, when used, the scavenging step using a linking monomer reduces any remaining formaldehyde previously formed as a byproduct of the polymerization reaction.

In some examples, the formaldehyde content present after the oxidation step is less than 0.1% w/w. In other examples, the formaldehyde scavenging step is carried out until the formaldehyde content is below 2-5% (w/w %), or optionally below 0.8% or below 0.5% or below 0.1% (w/w %).

After the polymerization, post-polymerization reactions, and optional formaldehyde scavenging step, water can optionally be added or removed from the product mixture. The final concentration of phosphine oxide-containing polymer dissolved solids after adding or removing water may be 20-70%, or optionally 40-60%, or optionally 45-55%, or optionally 49-51%.

III. PHOSPHINE OXIDE-CONTAINING POLYMER FORMULATIONS

The herein described water-soluble, phosphine-oxide containing, flame-retardant polymers may be formulated as a solution for treating substrates, e.g., fibers and textiles, to impart flame-retardant properties to the substrates. The formulations optionally include other chemicals, referred to herein as textile auxiliaries, to ensure optimal performance. At least some of these textile auxiliaries are commercially available as solutions, dispersions, or emulsions of an active ingredient (e.g., a polymeric softener) in a solvent. The solvent typically is water or alcohol-based. Optionally, the solvent may be water, alcohol, another organic solvent, or a combination thereof. As used herein, the concentration of the textile auxiliaries in the disclosed formulations are provided as the percentage of the active ingredient, referred to herein as the auxiliary "solids," in the disclosed formulations, irrespective of the concentration of the active ingredient in any commercial product, and irrespective of whether the auxiliary "solids" are dissolved, dispersed, or emulsified in the disclosed formulations.

Crosslinking agents may be included in the formulation to covalently bind the polymer to the fiber and/or crosslink the polymer into an insoluble form on the fiber. These crosslinking agents can improve the launderability and durability of the flame-retardant finish on the treated fiber or textile by 1) forming a covalent bond between the phosphine oxide-containing polymer and fiber or textile, thus chemically binding the polymer to the fiber or textile, and/or 2) forming covalent bonds between two or more phosphine oxide-containing polymer chains, thus increasing the molecular weight and significantly reducing the solubility of the polymer. Useful crosslinking agents for this application include urea-formaldehyde based crosslinkers, melamine-formaldehyde based crosslinkers, furan-formaldehyde based crosslinkers, silyl based crosslinkers, isocyanate crosslinkers, blocked isocyanate crosslinkers, carbodiimide crosslinkers, and epoxy crosslinkers. The concentration of the crosslinker in the formulation ranges from 0-50% (w/w %) crosslinker solids relative to the mass of polymer in the formulation. In some embodiments, the optimal concentration of the crosslinker in the formulation ranges from 20-40% (w/w %) crosslinker solids relative to the mass of polymer in the formulation. Depending on the mechanism of crosslinking, the pH of the solution can be adjusted to the optimal range as is known by one of skill in the art.

In addition to the phosphine oxide-containing polymer and crosslinking agent, in some embodiments, the formulations described herein may include one or more textile auxiliaries such as softeners (e.g., silicone, polyglycol ethers), buffers (e.g., citrate, acetate), catalysts (e.g, Lewis or Bronsted catalysts), wetting agents (e.g., non-ionic surfactants, anionic surfactants), defoaming agents (e.g., silicone, polyglycol ethers), binders (e.g., acrylic or polyurethane dispersions), thickeners, dispersants, solvents, or other additives used to improve the applicability of the polymer solution to the fiber or textile or to improve the physical/tactile properties of the final treated fiber or textile. For example, any of the following additives can be omitted from the formulations or can be included in the described amounts in the formulations described herein: textile softeners at concentrations of 0.05-5.0% (w/w %) softener solids relative to the total formulation; buffers at concentrations of 0.05-10.0% (w/w %) buffer solids relative to the total formulation; catalysts at concentrations of 0.05-10.0% (w/w %) catalyst solids relative to the total formulation (to promote crosslinking of the polymer and crosslinking agent on the substrate); wetting agents at concentrations of 0.05-4.0% (w/w %) wetting agent solids relative to the total formulation; defoaming agents at concentrations of 0.01-1.0% (w/w %) defoaming agent solids relative to the total formulation; binders at concentrations of 0.5-20.0% (w/w %) binder solids relative to the total formulation; thickeners at concentrations of 0.01-3.0% (w/w %) thickener solids relative to the total formulation.

IV. METHODS OF USING POLYMERS

The phosphine oxide-containing polymers described herein are useful for imparting flame-retardant properties to substrates, such as fibers and textiles. For example, the polymers and formulations described herein may be applied to fibers and textiles to retard or reduce the extent of damage to fibers and textiles due to excessive heat or fire. While traditional flame-retardant chemistries for cotton-based fibers and textiles must be cured with gaseous ammonia while on the substrate to secure the flame retardant and ensure wash durability, the herein described polymers and formulations may be applied to fibers and textiles, including cotton-based fibers and textiles, without the need for curing with gaseous ammonia.

A method of imparting flame resistance to a fiber or textile includes (a) applying a phosphine oxide-containing polymer formulation as described herein to a fiber or textile and (b) drying/curing the formulation on the fiber or textile. The formulation may be applied by any known method, including but not limited to immersion in a bath of the formulation, spraying the formulation on the fiber or textile, knife coating, via screen printing, or other methods known to those practiced in the art. The step of drying/curing includes crosslinking the phosphine oxide-containing polymer onto or around the fiber or textile. The phosphine oxide-containing polymer may be any phosphine oxide-containing polymer described herein. In some embodiments, the phosphine oxide-containing polymer is a reaction product of a hydroxymethyl phosphonium salt and a linking monomer, wherein at least 20% of the phosphorus atoms are present as phosphine oxides, and wherein the polymer is water-soluble. In some embodiments, at least 40%, at least 60%, at least 90%, at least 95%, at least 98%, or 100% of the phosphorus atoms are present as phosphine oxides.

In some embodiments, a phosphine oxide-containing polymer formulation as described herein may be provided as a concentrated aqueous solution that is diluted with water prior to use as a treating composition for treating fibers or textiles. As another example, the concentrated aqueous solution may be diluted with an organic solvent such as methanol, ethanol, 2-propanol, or acetone prior to use as a treating composition for treating fibers or textiles.

In some embodiments, in addition to the phosphine oxide-containing polymer the formulation may also include one or more additional flame retardants. Alternatively, one or more additional flame retardants may be applied to the fibers or textiles in an application step separate from application of the phosphine oxide-containing polymer formulation. In some embodiments, application of additional flame retardant(s) may precede the application of the phosphine oxide-containing polymer described herein; in still other embodiments, the application of additional flame retardant(s) may follow the application of the phosphine oxide-containing polymer described herein.

After the phosphine oxide-containing polymer formulation is applied to the fiber or textile, the fiber or textile may be dried. Drying may be carried out according to a variety of methods provided sufficient energy is provided to evaporate water from the polymer solution and to initiate sufficient crosslinking for the target final specification. Drying the fiber or textile can optionally include heating the fiber or textile. For example, wet treated fibers or textiles can be dried in an oven heated to 100° C. to 190° C., or optionally to 140° C. to 170° C. Drying the fiber or textile can be accelerated to less than 10 minutes by using a drying oven.

A method of treating may optionally further include a wash step to remove salts, residues, and other contaminants from the fiber or textile. In some embodiments, the wash step modifies the pH of the treated fabric.

Burn resistance of the treated fibers or textiles can be measured according to a variety of methods. Optionally, treated textiles may be evaluated for burn resistance according to ASTM method 6413 or ISO 15025.

V. EXAMPLES

The examples below are intended to further illustrate certain aspects of the methods and compounds described herein, and are not intended to limit the scope of the claims.

Example 1: Small-Scale Synthesis of a Phosphine-Oxide Polymer

To a 250 mL 4-neck round bottom flask fitted with overhead stirring, heating mantle, thermocouple and condenser was added 50.0 g of a solution of tetrakis(hydroxymethyl)phosphonium chloride ("THPC") (80% in water, % w/w), 50.0 g of deionized water, and 2.50 g of a solution of sodium hydroxide (50% in water, % w/w). After the reagents were added, the measured pH was 6.5. Urea (9.08 g) was added to the mixture, and the mixture was heated at 100° C. for 4 hours. The degree of polymerization was monitored by dynamic light scattering (DLS). Once the DLS measured z-average particle size ("z-avg") >20 nm, 8.16 g of a solution of hydrogen peroxide (35% in water, % w/w) was added slowly using an addition funnel resulting in a significant exotherm. After addition of the hydrogen peroxide, the measured pH was pH 1.0. Then, 7.16 g of a solution of sodium hydroxide (50% in water, % w/w) was added dropwise via an addition funnel resulting in a significant exotherm. After addition of the sodium hydroxide, the measured pH was 7.0. Then 4.08 g of a solution of hydrogen peroxide (35% in water, % w/w) was added dropwise via an addition funnel resulting in a significant exotherm. The measured pH was 3.5. Then, 3.93 g of a solution of sodium hydroxide (50% in water, % w/w) was added dropwise via an addition funnel to the reaction mixture resulting in a significant exotherm. The measured pH was 7.0. Then, 4.08 g of a solution of hydrogen peroxide (35% in water, % w/w) was added dropwise via an addition funnel to the reaction mixture resulting in a significant exotherm. The measured pH was 3.5. Then 2.34 g of a solution of sodium hydroxide (50% in water, % w/w) was added dropwise via an addition funnel to the reaction mixture resulting in a significant exotherm. The measured pH was 7.0. Then 5.10 g of a solution of hydrogen peroxide (35% in water, % w/w) was added dropwise via an addition funnel to the reaction mixture resulting in a significant exotherm. The measured pH was 2.5. Then 3.36 g of a solution of sodium hydroxide (50% in water, % w/w) was added dropwise via an addition funnel to the reaction mixture resulting in a significant exotherm. The measured pH was 9.0. Urea (3.41 g) was charged and the mixture held at 100° C. for 3 h, after which the reaction mixture was cooled to room temperature. The aqueous mixture was concentrated to 50% dissolved solids using a rotary evaporator and water bath at 60° C. The product was afforded as 108.21 g of a clear to pale yellow homogeneous liquid.

Example 2: Small-Scale Synthesis of Phosphine-Oxide Polymer

To a 250 mL 4-neck round bottom flask fitted with overhead stirring, heating mantle, thermocouple and condenser was added 50 g of a solution of tetrakis(hydroxymethyl)phosphonium chloride ("THPC") (80% in water, % w/w), 30.27 g of deionized water, and 5.88 g of a solution of sodium hydroxide (50% in water, % w/w). After the reagents were added, the measured pH was 7.0. Then, 5.07 g of urea was added to the mixture and the mixture heated at 100° C. for 4.5 hours. The degree of polymerization was monitored by dynamic light scattering (DLS). Once the DLS measured z-avg>20 nm, 8.16 g of a solution of hydrogen peroxide (35% in water, % w/w) was added slowly using an addition funnel resulting in a significant exotherm. After addition of the hydrogen peroxide, the measured pH was 1.0. Then, 7.16 g of a solution of sodium hydroxide (50% in water, % w/w) was added dropwise via an addition funnel resulting in a significant exotherm. After addition of the sodium hydroxide, the measured pH was 7.0. Then, 4.08 g of a solution of hydrogen peroxide (35% in water, % w/w) was added dropwise via an addition funnel resulting in a significant exotherm. The measured pH was 3.5. Then 3.93 g of a solution of sodium hydroxide (50% in water, % w/w) was added dropwise via an addition funnel to the reaction mixture resulting in a significant exotherm. The measured pH was 7.0. Then, 4.08 g of a solution of hydrogen peroxide (35% in water, % w/w) was added dropwise via an addition funnel to the reaction mixture resulting in a significant exotherm. The measured pH was 3.5. Then 2.34 g of a solution of sodium hydroxide (50% in water, % w/w) was added dropwise via an addition funnel to the reaction mixture resulting in a significant exotherm. The measured pH was 7.0. Then 5.10 g of a solution of hydrogen peroxide (35% in water, % w/w) was added dropwise via an addition funnel to the reaction mixture resulting in a significant exotherm. The measured pH was 2.5. Then, 3.36 g of a solution of sodium hydroxide (50% in water, % w/w) was added dropwise via an addition funnel to the reaction mixture resulting in a significant exotherm. The measured pH was 9.0. Then 3.80 g of urea was charged and the mixture held at 100° C. for 3 hours, after which the reaction mixture was cooled to room temperature. The aqueous mixture was concentrated to 50% dissolved solids using a rotary evaporator and water bath at 60° C. The product was afforded (100.19 g) as a clear to pale yellow homogeneous liquid.

Example 3: Large Batch Synthesis of Phosphine-Oxide Polymer

To a 20 liter jacketed glass reactor fitted with overhead stirring, thermocouple and condenser was added 5.24 kg of a solution of tetrakis(hydroxymethyl)phosphonium chloride ("THPC") (80% in water, % w/w), 5.24 L deionized water and 0.26 kg of a solution of sodium hydroxide (50% in water, % w/w). After the reagents were added, the measured pH was 6.5. 0.96 kg of urea was added to the mixture, and the mixture heated to 100° C. for 4 h to polymerize. The degree of polymerization was monitored by dynamic light scattering (DLS). Once the DLS measured z-avg>20 nm, 0.85 kg of a solution of hydrogen peroxide (35% in water, % w/w) was added using an addition funnel resulting in a significant exotherm. The measured pH was 1.0. Then 0.93 kg of a solution of sodium hydroxide (50% in water, % w/w) was added via an addition funnel also resulting in a significant exotherm. The measured pH was 7.0. Then 0.43 kg of a solution of hydrogen peroxide (35% in water, % w/w) was added dropwise via an addition funnel resulting in a significant exotherm. The measured pH was 3.5. Then 0.25 kg of a solution of sodium hydroxide (50% in water, % w/w) was added dropwise via an addition funnel to the reaction mixture resulting in a significant exotherm. The measured pH was 7.0. Then 0.43 kg of a solution of hydrogen peroxide (35% in water, % w/w) was added dropwise via an addition funnel to the reaction mixture resulting in a significant exotherm. The measured pH was 3.5. Then 0.25 kg of a solution of sodium hydroxide (50% in water, % w/w) was added dropwise via an addition funnel to the reaction mixture resulting in a significant exotherm. The measured pH was 7.0. Then 0.53 kg of a solution of hydrogen peroxide (35% in water, % w/w) was added dropwise via an addition funnel to the reaction mixture resulting in a significant exotherm. The measured pH was 2.5. Then 0.39 kg of a solution of sodium hydroxide (50% in water, % w/w) was added dropwise via an addition funnel to the reaction mixture resulting in a significant exotherm. The measured pH was 9.0. The mixture was cooled to room temperature, affording the product (15.5 kg) as a homogeneous clear to pale yellow liquid at 35.4% dissolved solids.

Example 4: Large Batch Synthesis of Phosphine-Oxide Polymer

To a 20 liter jacketed glass reactor fitted with overhead stirring, thermocouple and condenser was added 4.76 kg of a solution of tetrakis(hydroxymethyl)phosphonium chloride ("THPC") (80% in water, % w/w), 2.88 L deionized water and 0.48 kg of a solution of sodium hydroxide (50% in water, % w/w). The measured pH was 7. Then 0.48 kg of urea was added to the mixture, and the mixture heated to 100° C. for 4.5 h to polymerize. The degree of polymerization was monitored by dynamic light scattering (DLS). Once the DLS measured z-avg>20 nm, 0.78 kg of a solution of hydrogen peroxide (35% in water, % w/w) was added using an addition funnel resulting in a significant exotherm. The measured pH was 1.0. 0.528 kg of a solution of sodium hydroxide (50% in water, % w/w) was then added via an addition funnel also resulting in a significant exotherm. The measured pH was 7.0. Then 0.39 kg of a solution of hydrogen peroxide (35% in water, % w/w) was added dropwise via an addition funnel resulting in a significant exotherm. The measured pH was 3.5. Then 0.24 kg of a solution of sodium hydroxide (50% in water, % w/w) was added dropwise via an addition funnel to the reaction mixture resulting in a significant exotherm. The measured pH was 7.0. Then 0.39 kg of a solution of hydrogen peroxide (35% in water, % w/w) was added dropwise via an addition funnel to the reaction mixture resulting in a significant exotherm. The measured pH was 3.5. Then 0.21 kg of a solution of sodium hydroxide (50% in water, % w/w) was added dropwise via an addition funnel to the reaction mixture resulting in a significant exotherm. The measured pH was 7.0. Then 0.49 kg of a solution of hydrogen peroxide (35% in water, % w/w) was added dropwise via an addition funnel to the reaction mixture resulting in a significant exotherm. The measured pH was 2.5. Then 0.51 kg of a solution of sodium hydroxide (50% in water, % w/w) was added dropwise via an addition funnel to the reaction mixture resulting in a significant exotherm. The measured pH was 9.0. The mixture was cooled to room temperature, affording the product (12.1 kg) as a homogeneous clear to pale yellow liquid at 38% dissolved solids.

Example 5: Application of a Phosphine Oxide Polymer to a Fabric 160.0 g of water soluble, phosphine oxide polymer solution (98-99% phosphine oxide; 35.4% dissolved polymer solids), prepared according to Example 3, was added to a homogeneous dispersion containing (i) 26.68 g of AQ-7551 (a methylated melamine-formaldehyde resin crosslinking agent from Ineos, 78% in water, % w/w) (ii) 30.77 g of Sermul EA-266 (a commercially available wetting agent from Elementis, 26% in water, % w/w), and (iii) 12.00 g of Megasoft Jet LF-01 (a commercially available silicone-based hand softener from Huntsman, 15.6% in water, % w/w).

To the resulting mixture was added 8.0 g of a citric acid/phosphate aqueous buffer solution containing phosphoric acid (25% w/w) and citric acid (25% w/w) adjusting the total formulation to pH 4.6.

The formulation was applied to a swatch of 100% cotton twill fabric (dry weight 23.781 g) using a pad roller, with a wet pick-up of 100-105%. The wet treated fabric was pre-dried in a 110° C. oven for 5 minutes, then cured for 7 minutes in a 170° C. oven. The swatch was then washed for 30 seconds in a 0.1 M sodium carbonate aqueous bath at pH 9, before rinsing in fresh water. The rinsed fabric was again placed in a 110° C. oven for 7 minutes or until dry.

Example 6: Burn Study of Fabric Treated with Water Soluble, Phosphine Oxide Polymer The fabric swatch prepared in Example 5 was acclimated for 4-24 hours at 20° C. (68° F.) and 65% relative humidity. Burn resistance was measured according to ASTM D-6413, and an average char length of less than 90 mm was recorded. Afterflame for all burned fabric strips was 0 seconds. Representative data is shown in Table 1.

TABLE 1

| 100% cotton (7 osy greige fabric with 20% add on) | | |
|---|---|---|
| | Char Length | Afterflame |
| 0 wash cycles | 80 mm | 0 sec |
| 10 wash cycles | 77 mm | 0 sec |
| 25 wash cycles | 89 mm | 0 sec |
| 50 wash cycles | 78 mm | 0 sec |

Laundering conditions: 60° C. with AATCC detergent

Example 7: Application of a Phosphine Oxide Polymer to a Fabric 200.0 g of water soluble, phosphine oxide polymer solution (98-99% phosphine oxide; 38% dissolved polymer solids), prepared according to Example 3, was added to a homogeneous dispersion containing (i) 33.3 g of AQ-7551 (a methylated melamine-formaldehyde resin crosslinking agent from Ineos, 78% in water, % w/w), (ii) 30.77 g of Sermul EA-266 (a commercially available wetting agent from Elementis, 26% in water, % w/w), and (iii) 12.00 g of Megasoft Jet LF-01 (a commercially available silicone-based hand softener from Hutnsman, 15.6% in water, % w/w).

To the resulting mixture was added 10.0 g of a citric acid/phosphate aqueous buffer containing phosphoric acid (25% w/w) and citric acid (25% w/w). The formulation was applied to a swatch of 75% cotton, 25% polyester twill (dry weight 26.542 g) using a pad roller, with a wet pick-up of 78-84%. The wet treated fabric was pre-dried in a 110° C. oven for 5 minutes, then cured for 7 minutes in a 170° C. oven. The swatch was then washed for 30 seconds in a 0.1 M sodium carbonate aqueous bath at pH 9, before rinsing in fresh water. The rinsed fabric was again placed in a 110° C. oven for 7 minutes or until dry.

Example 8: Burn Study of Fabric Treated with Water Soluble, Phosphine Oxide Polymer The fabric swatch prepared in Example 7 was acclimated for 4-24 hours at 20° C. (68° F.) and 65% relative humidity. Burn resistance was measured according to ASTM D-6413, and an average char length less than 115 mm was recorded. Afterflame for all burned fabric strips was 0 seconds. Representative data is shown in Table 2.

TABLE 2

75% cotton/25% polyester
(7 osy greige fabric with 20% add on)

| | Char Length | Afterflame |
| --- | --- | --- |
| 0 wash cycles | 108 mm | 0 sec |
| 10 wash cycles | 98 mm | 0 sec |
| 25 wash cycles | 114 mm | 0 sec |
| 50 wash cycles | 102 mm | 0 sec |

Laundering conditions: 60° C. with AATCC detergent

Representative flammability test results are shown in FIG. 1A-C. FIGS. 1A-C show photos of fabric samples treated with water-soluble phosphine oxide-containing polymers disclosed herein after flammability tests performed according to ASTM 6413. FIG. 1A shows a 3.1 osy fabric treated with 21% add on. FIG. 1B shows a 10.5 osy fabric treated with 18% add on. FIG. 1C shows a 14.0 osy fabric treated with 14% add on.

What is claimed is:

1. A polymer comprising a plurality of repeat units of Formula IIx, Formula IIy, or Formula IIz

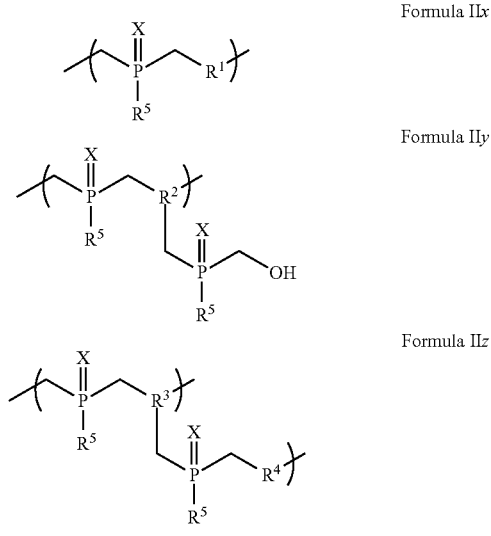

wherein each X in each repeat unit independently is oxygen or is absent; each $R^1$, $R^2$, $R^3$, and $R^4$ in each repeat unit independently is a residue of a linking monomer that is capable of forming two or more covalent bonds with a phosphorus-containing monomer via condensation reactions with formaldehyde; and each $R^5$ in each repeat unit independently is hydroxymethyl, aryl, or linear or branched $C_1$-$C_{10}$alkyl;

wherein the polymer comprises a plurality of repeat units of Formula IIy or Formula IIz;

wherein the polymer has a number average molecular weight less than 1,000,000;

wherein at least 20% of the phosphorus atoms in the polymer are present as phosphine oxide; and wherein the polymer is water soluble.

2. The polymer of claim 1, wherein the linking monomer comprises a urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; aminoplast; substituted or unsubstituted phenol; substituted or unsubstituted resorcinol; substituted or unsubstituted furan; 4-aminophenol; or a derivative or combination thereof.

3. The polymer of claim 2, wherein $R^5$ is hydroxymethyl.

4. The polymer of claim 1, wherein the linking monomer is urea.

5. The polymer of claim 1, wherein the molar ratio of phosphorus atoms to linking monomer residues is from 1:0.3 to 1:0.95.

6. The polymer of claim 1, wherein the percentage of phosphorus atoms in the polymer present as phosphine oxide is at least 40%.

7. A polymer comprising a reaction product of a plurality of phosphorus-containing monomers comprising:

tetrakis(hydroxymethyl) phosphonium salts or tris(hydroxymethyl) phosphonium salts, wherein the tetrakis(hydroxymethyl) phosphonium salts or tris(hydroxymethyl) phosphonium salts are in equilibrium with their respective hydroxymethyl phosphines and formaldehyde; and a plurality of linking monomers that are capable of forming two or more covalent bonds with the phosphorus-containing monomers via condensation reactions with formaldehyde, wherein the molar ratio of phosphorus-containing monomers to linking monomers is from 1:0.3 to 1:0.95;

wherein the polymer has a number average molecular weight less than 1,000,000;

wherein at least 20% of the phosphorus atoms in the polymer are present as phosphine oxide, and wherein the polymer is water soluble.

8. The polymer of claim 7, wherein the plurality of linking monomers comprises urea; cyclic urea; thiourea; cyclic thiourea; substituted or unsubstituted 1,3,5-triazine-2,4,6-triamine; 6-methyl-1,3,5-triazine-2,4-diamine; dicyandiamide; substituted or unsubstituted aniline; aminoplast; substituted or unsubstituted phenol; substituted or unsubstituted resorcinol; substituted or unsubstituted furan; 4-aminophenol; or a derivative or combination thereof.

9. The polymer of claim 8, wherein the plurality of linking monomers comprises urea.

10. The polymer of claim 7, wherein the percentage of phosphorus atoms in the polymer present as phosphine oxide is at least 40%.

11. The polymer of claim 7, wherein the polymer is hyperbranched.

12. A method for forming the polymer of claim 1, the method comprising:
  forming an intermediate polymer by reacting a plurality of phosphorus-containing monomers comprising hydroxymethyl phosphonium salts in equilibrium with their respective hydroxymethyl phosphines and formaldehyde with
  (i) a plurality of linking monomers that are capable of forming two or more covalent bonds with the phosphorus-containing monomers via condensation reactions with formaldehyde, or
  (ii) a plurality of oligomers, wherein the oligomers comprise hydroxymethyl phosphonium moieties and linking monomers; and
  oxidizing the intermediate polymer to form the polymer of claim 1;
  wherein after the oxidation step at least 20% of the phosphorus atoms in the phosphine oxide-containing polymer are present as phosphine oxide; and
  wherein the phosphine oxide-containing polymer is water soluble.

13. The method of claim 12, wherein when the plurality of phosphorus-containing monomers is reacted with the plurality of linking monomers the molar ratio of phosphorus-containing monomers to linking monomers in the reacting step is from 1:0.3 to 1:0.95, and wherein when the plurality of phosphorus-containing monomers is reacted with the plurality of oligomers, the molar ratio of total phosphorus atoms in the oligomers and in the phosphorus-containing monomers to linking monomers in the reacting step is from 1:0.3 to 1:0.95.

14. The method of claim 12, wherein when the plurality of phosphorus-containing monomers is reacted with the plurality of linking monomers the molar ratio of phosphorus-containing monomers to linking monomers in the reacting step is from 1:0.6 to 1:0.8.

15. The method of claim 12, wherein the reacting step and the oxidizing step are carried out in aqueous medium.

16. The method of claim 12, wherein when the plurality of phosphorus-containing monomers is reacted with the plurality of linking monomers the reacting step is carried out in an aqueous medium and wherein the step of reacting comprises heating the aqueous solution at a temperature between about 40° C. and about 120° C.

17. The method of claim 12, wherein the step of oxidizing comprises:
  adding a first charge of an oxidizing agent;
  adding a first charge of a base, and
  adding a second charge of the oxidizing agent.

18. The method of claim 17, further comprising:
  adding a second charge of the base;
  adding one or more additional charges of the oxidizing agent; and
  for each additional charge of the oxidizing agent adding an additional charge of the base.

19. The method of claim 12, wherein when the plurality of phosphorus-containing monomers is reacted with the plurality of linking monomers the linking monomer reacted in the reaction step is a first charge, and wherein the method further comprises after the oxidation step adding a second charge of the linking monomer.

20. The method of claim 12, further comprising after the oxidizing step, desalting the reaction mixture.

21. The method of claim 12, wherein the method is carried out in a single reaction vessel.

22. A method of imparting flame resistance to a substrate comprising:
  (a) contacting the substrate with a treating composition comprising the polymer of claim 1; and
  (b) drying the substrate.

23. The method of claim 22, wherein contacting the substrate comprises immersing the substrate in the treating composition.

24. The method of claim 22, wherein contacting the substrate comprises spraying the treating composition onto the substrate.

25. The method of claim 22, wherein drying the substrate comprises heating the substrate.

26. The method of claim 22, wherein the treating composition further comprises a crosslinking agent, and wherein the step of drying the substrate further comprises crosslinking the polymer.

27. The method of claim 22, wherein the method does not comprise an oxidation step.

28. The method of claim 22, wherein the substrate comprises a fiber or textile.

29. A textile article treated by the method of claim 22.

* * * * *